Mar. 20, 1923. 1,449,001
W. HILDEBRAND
CONTROLLING MECHANISM FOR COMPOUND BRAKES
Filed July 21, 1920 3 sheets-sheet 1
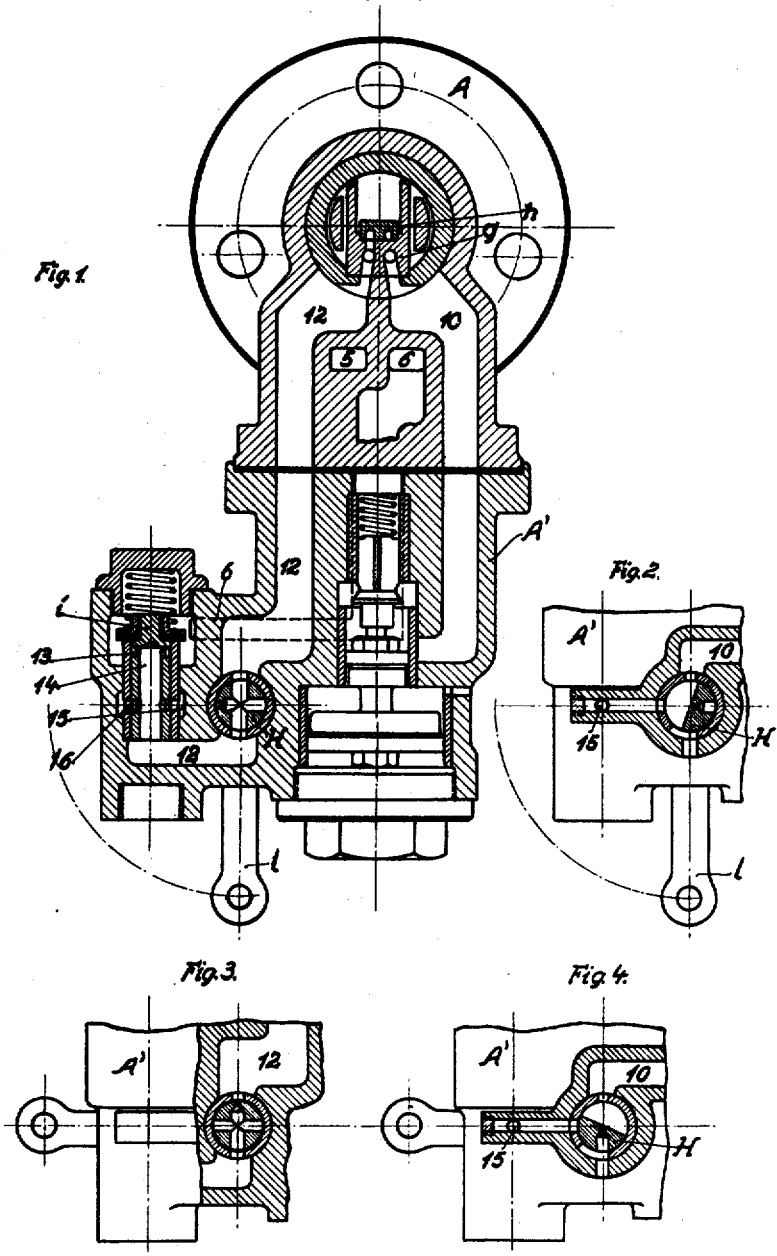

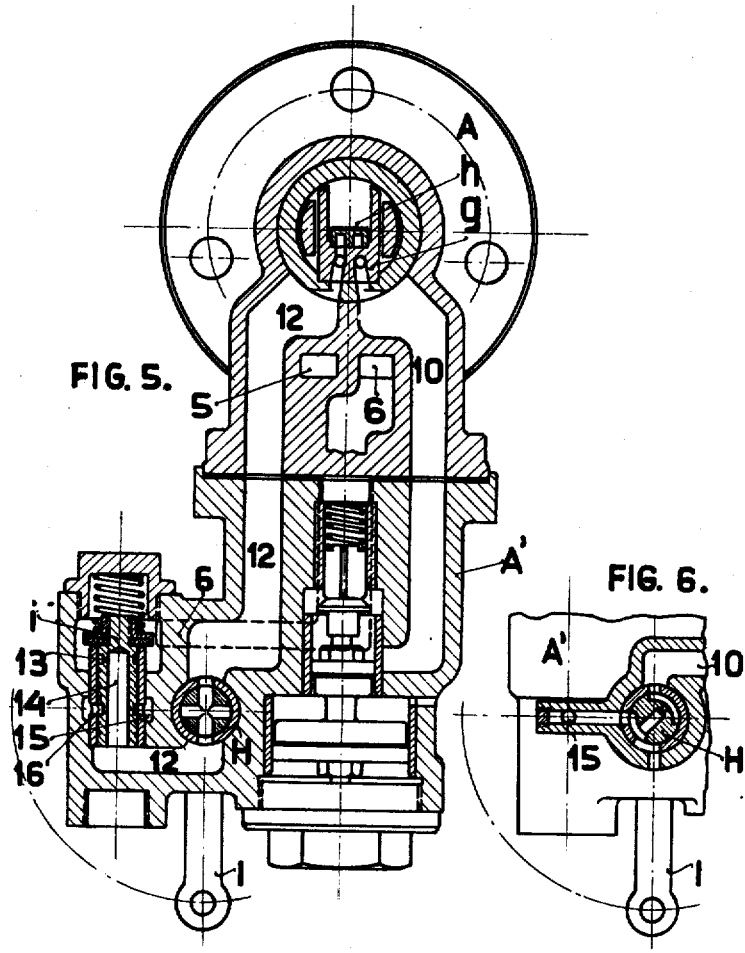
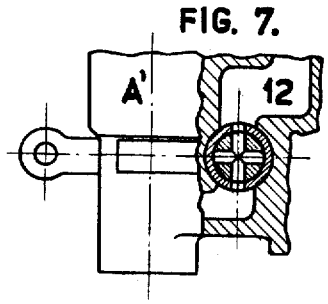
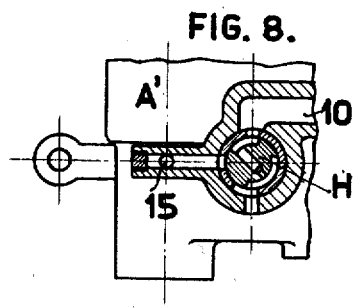

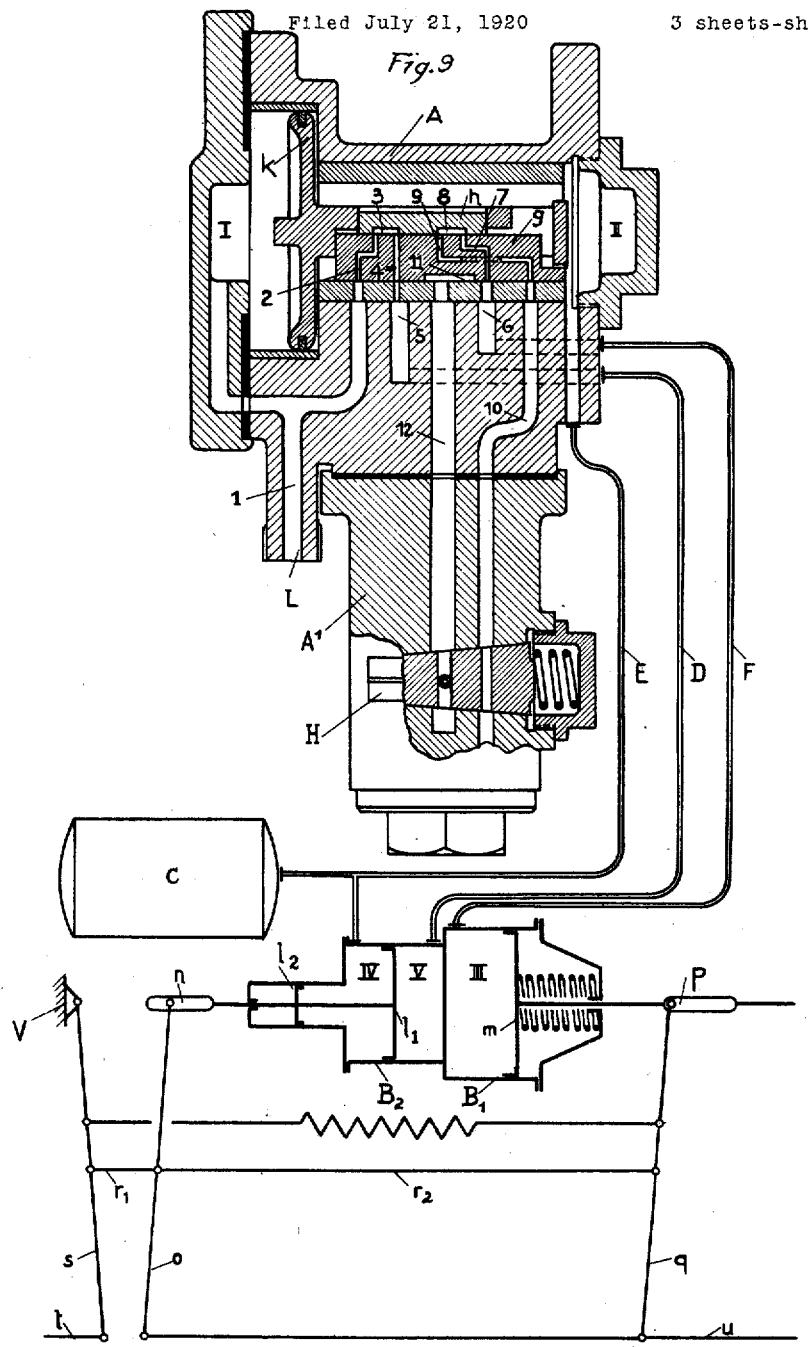

Patented Mar. 20, 1923.

1,449,001

UNITED STATES PATENT OFFICE.

WILHELM HILDEBRAND, OF BERLIN, GERMANY, ASSIGNOR TO KNORR-BREMSE AKTIENGESELLSCHAFT, OF LICHTENBERG, BERLIN, GERMANY.

CONTROLLING MECHANISM FOR COMPOUND BRAKES.

Application filed July 21, 1920. Serial No. 398,036.

*To all whom it may concern:*

Be it known that I, WILHELM HILDEBRAND, a German citizen, residing at Neue Bahnhofstrasse 9–17, Lichtenberg, Berlin O., 112, Germany, have invented certain new and useful Improvements in Controlling Mechanism for Compound Brakes (for which I have filed applications in Germany, April 28, 1915, Patent No. 295,743; Austria, May 19, 1915, Patent No. 76,612; Hungary, May 31, 1915, Patent No. 69,234; Great Britain, May 9, 1916, Patent No. 106,131; Spain, May 13, 1916, Patent No. 62,279; and Finland, June 21, 1919, Patent No. 8,332), of which the following is a specification.

This invention relates to controlling mechanism for use with a compound brake consisting of a double chambered brake cylinder and a single chambered brake cylinder, whereby it is possible to utilize existing compound brakes both in passenger trains and in goods trains.

According to the invention this effect is obtained by the arrangement of a controlling cock or the like in combination with a plain triple control valve. The controlling cock may be conveniently arranged in the passage leading from the idle space of the cylinder of the double chambered brake to the outer air, and it wholly or partly suspends, by its adjustment, the cooperation of the cylinder of the double chambered brake, while the communication of the idle space of the cylinder of the double chambered brake with the outer air is cut off; also, according to circumstances, the cross section of the passage from the said space to the cylinder of the single chambered brake may be throttled.

According to a further part of the invention the combined control valve is also adapted for use with ordinary goods wagon, taking into consideration the weight of the load. In the case of a loaded goods wagon the cross section of the passage through the check valve from the idle chamber of the double chambered brake cylinder to the cylinder of the single chambered brake or to the outer air respectively is throttled, and in the case of an unloaded goods wagon the cross section of the passage from the idle chamber to the cylinder of the single chambered brake by way of the controlling cock is more or less throttled, and the idle chamber is completely cut off from the outer air.

Figure 1 shows in vertical section a control valve with controlling cock and check valve in accordance with this invention in the position for passenger train brakes.

Figure 2 is a vertical section through another part of the cock, shown in the same position.

Figures 3 and 4 illustrate the position of the controlling mechanism for use with a similar brake on goods trains.

Figures 5 and 6 show sections similar to Figures 1 and 2, but adapted for use with a control valve on wagons used only in goods traffic, the controlling cock and the check valve being shown adjusted for loaded wagons. Figures 7 and 8 show a vertical section through the controlling cock adjusted for goods wagons in an unloaded condition. Figure 9 illustrates the complete arrangement of the compound brake consisting of compound brake cylinder with brake levers and connections; control valve and controlling cock in section.

The compound control valve A, as shown in Figure 9, is attached to the main brake pipe or train pipe at L, and to the single chambered brake cylinder $B_1$, through the passage F.

The piston K of the control valve A divides the interior of the casing into the slide-valve chamber I, which communicates with the main brake pipe, and the slide-valve chamber II. In the latter is arranged the main slide valve $g$, which is formed as a drag slide valve, and on the back of which moves the graduating slide valve $h$, which is rigidly connected with the body of the piston rod. The latter valve serves as a closing organ both for gradual braking and for gradual release.

The slide-valve chamber II is connected through the tube E with the auxiliary reservoir C and the working chamber IV of the double chambered brake cylinder $B_2$. The piston rod of the piston $m$ in the single chambered brake-cylinder $B_1$, and also the piston rod of the two pistons $1_1$, $1_2$ in the double chambered brake cylinder $B_2$ are connected at $p$ and $n$ respectively with the levers $q$, $o$ of the brake rigging. The levers $q$, $o$ are connected through the rod $r_2$, which through its continuation $r_1$ is attached to the lever $s$ of the brake rigging, which has its fulcrum at $v$. The brake lever-connections $t$, $u$, are fastened to the lever $s$, and to the levers $q$ and $o$ respectively.

A spring-loaded check valve $i$ and a controlling cock H, (Figures 1 and 5), are arranged between the idle chamber V and the single chambered brake cylinder $B_1$, these being adjustable in such a way that the compound brake can be applied both to short (passenger) trains and to long (goods) trains, and in the latter can also be adapted to suit the weight of the load.

In the full release position (Figure 9), the working space IV of the double chambered brake, and the auxiliary air reservoir C, are connected through the tube E and the chambers II, I, with the main brake pipe L; the idle space V on the other hand being connected with the main brake pipe L through the pipe D and the passages 5, 4, 3, 2, 1, in the control valve A, while the pressure chamber III of the single chambered brake cylinder $B_1$, is connected with the outer air through the tube F and the passages 6, 7, 8, 9, 10 in the control valve A and the outlet opening in the controlling cock H.

In the brake "on" position of the control valve the idle space V is in communication by the pipe D and passages 5, 11, 12, controlling cock H, passages 14, 13 in the check valve $i$, (Figure 1), passages 6 and the pipe F, with the pressure chamber III of the single chambered brake cylinder $B_1$, and also when the valve $i$ closes by the branch passage 15 in the check valve, passage 16 (Figure 1) and the opening in the controlling cock H (Figure 2), in communication with the external air. The method of operation is as follows:—For the purpose of applying the brake, pressure in the main brake pipe is decreased, and the auxiliary reservoir pressure prevailing in the chamber II moves the piston $k$ so far to the left that the graduating slide valve $h$ closes communication between the passages 2, 4 of the main slide valve $g$, and consequently between the pipe L and the idle space V. As the pressure in the pipe is still further decreased, and communication is established between the idle space V and the check valve $i$ through the pipe D, passages 5, 11, 12 and controlling cock H, the air from the idle space, while it forces up the check valve $i$, flows through the internal cavity 14, the upper bore hole 13 and the passage 6, and also through the pipe F, to the single chambered brake cylinder, until the pressure between the idle space and the single chambered brake cylinder is equalized. Then the valve $i$ closes again, and the air still remaining in the idle space now flows through the lower bore hole 16 of the valve $i$ and the passage 15, and also through the opening of the controlling cock (Figure 2) into the open air. Hence the controlling cock is arranged in such a way that, having one of its channels (Figure 1) in the passage 12 and the other (Figure 2) in the passage 15, it governs the channels of both passages.

With the adjustment of the cock for passenger train brakes (Figures 1 and 2), the passage 12 passes through a wide bore hole of the cock H. The air obtaining admission from the idle space of the brake cylinder through the main slide valve $g$ into the passage 12 flows thence unhindered to the check valve $i$ and on into the single chambered brake-cylinder. Similarly, after closing of the valve $i$, the compressed air remaining behind in the idle space can escape unhindered into the open air, as the cock H also leaves free a large channel for the passage 15.

With the adjustment of the cock H for goods train brakes, on the other hand, the plug of the cock (Figure 3) only leaves a narrow bore hole open for the passage of the air from the idle space through the check valve $i$ to the single chambered brake cylinder, so that the brake pressure only rises slowly, in accordance with the requirements of goods train brakes. Moreover, the passage 15 is shut off by the cock H (Figure 4), so that the air still enclosed in the idle space of the double chambered cylinder after the closing of the valve $i$ cannot escape into the open air. By this means the rapidity of the braking action is materially diminished, as the double chambered cylinder only comes into operation to a very slight degree, if at all.

Since the method of releasing the brake must also be differently arranged for the two kinds of trains, being quick for passenger trains and slow for goods trains, the reversing of the exhaust opening for releasing is put into operation in the same cock. The passage 10 is the exhaust passage of the single chambered cylinder from the slide valve $g$; it will be seen from Figure 2 that for passenger train brakes it is opened wide by means of the cock H, while for goods train brakes (Figure 4) it is throttled by a nozzle provided in the plug of the cock.

In order to make the same control valve also applicable to ordinary goods trains, in which the weight of the load has to be taken into consideration, the cock H and the check valve $i$ are, according to the construction shown in Figures 5 to 8, modified in such a way that the check valve intended for goods wagons alone comprises the necessary throttling nozzle for connecting the idle space of the double chambered cylinder with the single chambered cylinder and with the open air; when the wagons are empty, however, (Figures 7 and 8), the opening through the controlling cock to the open air (Figure 8) is shut off.

The openings 13 and 16 (Figure 5) in the check valve $i$ are contracted in such a way that the over-flow of compressed air from the idle space of the double chambered brake cylinder along the passage 12 to the single chambered cylinder or into the outer air is throttled according to the requirements of goods train brakes. The plug of the cock H is shown in two positions in Figures 5 and 7 without contractions for the passage 12. The passage leading from the bore holes 15 to the open air is opened when the wagons are loaded (Figure 6), while for unloaded wagons it is closed (Figure 8).

Accordingly in the case of an unloaded wagon, only the single chambered brake cylinder comes fully into operation.

The opening (Figures 6 and 8) leading from the exhaust passage 10 into the open air is in both cases throttled in the plug of the cock.

For other kinds of brakes, according to the type of construction, either the contraction of the cross sections or the shutting off of the corresponding passages may also be employed, separately or together. Of course the invention is also evidently applicable to air suction brakes.

What I claim and desire to secure by Letters Patent of the United States, is:—

1. The combination with a compound brake comprising a double chambered brake and a single chambered brake of a control valve provided with a controlling cock, for the purposes described.

2. The combination with a compound brake comprising a double chambered brake and a single chambered brake of a control valve having a passage leading from the idle space of the double chambered brake to the outer air, and an adjustable cock in the said passage.

3. The combination with a compound brake comprising a double chambered brake and a single chambered brake of a control valve in which are exhaust passages communicating respectively with the idle space of the double chambered brake and with the pressure chamber of the single chambered brake, and an adjustable cock controlling both the said exhaust passages.

4. The combination with a compound brake comprising a double chambered brake and a single chambered brake of a control valve comprising a main slide valve and a check valve, a passage between the said slide valve and the said check valve, a passage between said check valve and the outer air, and adjustable means controlling both the said passages and adapted to throttle the cross section of the passage leading from the idle space of the double chambered brake and to single chambered brake and to cut off communication between the said idle space and the outer air.

5. The combination with a compound brake comprising a double chambered brake and a single chambered brake of a check valve and a plug cock having throttled passages therein to control air passages communicating respectively with the double chambered brake, the single chambered brake, and the outer air.

6. The combination with a compound brake comprising a double chambered brake and a single chambered brake of a check valve communicating through a plug cock with the idle space of the double chambered brake, and adapted to communicate through throttled openings in the said check valve with exhaust passages controlled by the said plug cock.

WILHELM HILDEBRAND.